June 4, 1968  L. LAZARE  3,386,912
DESALINATION OF SEA WATER
Filed Jan. 7, 1965
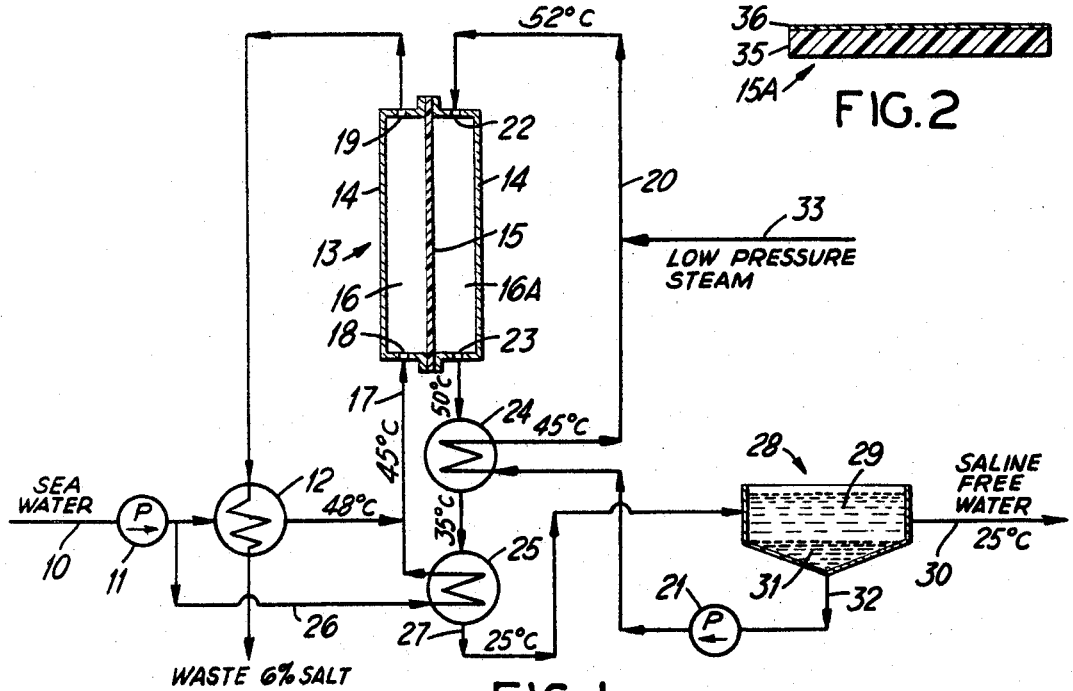
FIG. 1
FIG. 2
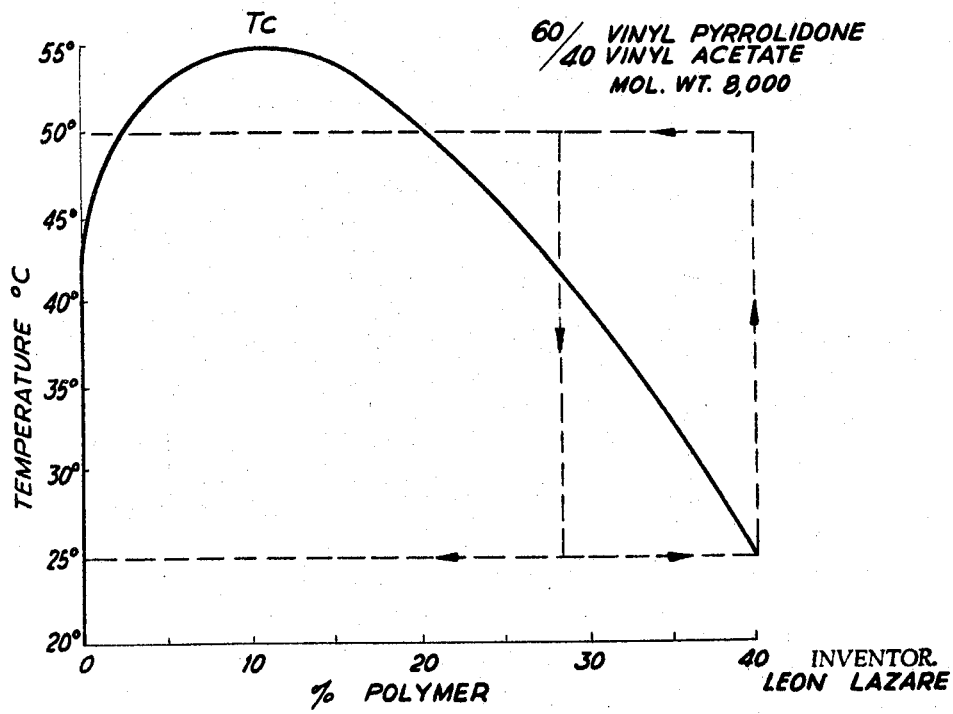
FIG. 3
INVENTOR.
LEON LAZARE
BY Philip B. Hilbert
ATTORNEY.

United States Patent Office 3,386,912
Patented June 4, 1968

3,386,912
DESALINATION OF SEA WATER
Leon Lazare, Stamford, Conn., assignor to The Puraq
Company, New York, N.Y., a partnership
Filed Jan. 7, 1965, Ser. No. 423,976
12 Claims. (Cl. 210—22)

ABSTRACT OF THE DISCLOSURE

A method of desalinating sea water comprising passing by osmosis part of the water from the sea water through a semipermeable membrane into an aqueous solution of partially water soluble copolymer of hydrophilic and hydrophobic monomers, and cooling the diluted solution to separate the product water.

This invention relates to processes for the desalination of saline containing aqueous liquids such as sea water and the like.

The growing need for additional sources of water to supply potable and agricultural requirements has directed intensive investigations into the desalination of sea water. Thus, substantial improvements have been made in known desalinating procedures based on flash evaporation, electrodialytic action, freezing, and the like. However, even with improvements, such known procedures require substantial amounts of power and heat differentials, and accordingly, the net cost of recovered saline free water is still relatively high so as to make feasible such installations only where cost is not a factor or where subsidies are available.

Accordingly, an object of this invention is to provide improved procedures for desalinating sea water or the like wherein power and heat differential requirements are so markedly reduced as to effect a substantial decrease in unit costs of the recovered water, as compared to that of known procedures.

Another object of this invention is to provide improved desalinating procedures which require relatively simple equipment which has low power requirements and minimal thermal values, together with chemicals which are recycled during the process with minimum losses, so as to minimize capital investment and operating costs calculated in terms of desalinated water recovered.

A further object of this invention is to provide an improved process of desalinating sea water utilizing selected separatory membranes and water solvents which lend themselves to the efficient separation of saline free water from the sea water, separated water being substantially free of solvent; the solvent being recycled to effect further desalination of sea water, to thereby achieve optimum, low cost operating conditions.

Yet another object of this invention is to provide in a process of the character described, membranes which are highly permeable to water while impermeable to electrolytes, together with selected partially water soluble polymers which in water solution have a critical phase separation temperature with respect to water which permits saline free water from the sea water to be driven through the membrane due to differential osmotic pressures, into the polymer solution to raise the water content thereof; the water enriched polymer solution lending itself to phase separation at temperatures below the critical phase separation temperature to provide a saline free water product which is also substantially free of polymer.

Other objects of this invention will in part be obvious and in part hereinafter pointed out.

In the drawing, FIG. 1 is a diagrammatic showing of a process for the desalination of sea water, embodying the invention;

FIG. 2 is a sectional view showing an alternative form of separator membrane, used in the process;

FIG. 3 is a phase separation diagram for a selected polymer solution used in the process.

Essentially, the process of the instant invention comprises the utilization of separatory membranes which are highly permeable to water while being impermeable to electrolytes, together with selected solutions of partially water soluble polymers in an extraction cell wherein a stream of sea water passes on one side of and in contact with the separatory membrane and the stream of polymer solution passes on the other side of and in contact with said separatory membrane.

The differential osmotic pressures of the sea water and the polymer solution, together with a counter current relation of the stream, provides a driving force for extracting saline free water from the stream of sea water, passing the same through the membrane to enrich the polymer solution which at elevated temperatures will dissolve substantial amounts of water. The water enriched polymer solution is then reduced as to its temperature at which phase separation will take place to provide a saline and polymer free water phase and a polymer solution of reduced water content for recycling to repeat the extractive procedure.

As shown in FIG. 1, the process embodying the invention may be operated on a continuous basis, as indicated in the flow diagram. Thus, a sea water supply line 10 carrying sea water of the usual approximately 3% salt content, and at a temperature of about 20° C., is passed by a pump 11 through a heat exchanger 12 effective to raise the temperature thereof to about 48° C. and thence to a separator cell generally indicated at 13. Essentially, cell 13 comprises a pair of dished, flanged casing members 14 suitably secured together in opposed relation at the flanged portions thereof and clamping therebetween the peripheral portions of a separatory membrane 15 which thus medially divides cell 13 into compartments 16, 16A.

The sea water feed, by way of line 17 enters compartment 16 of cell 13, now at a temperature of about 45° C., through an inlet 18; an outlet 19 being provided on the opposite side of compartment 16. Simultaneously a supply line 20 and a pump 21 provides a stream of water extractive agent in the form of an aqueous solution of partially water soluble polymer, to an inlet 22 to compartment 16A of cell 13; said extractive stream passing in counter current relation to the stream of sea water in compartment 16, and in contact with the other side of membrane 15, to an outlet 23 on the opposite side of compartment 16A.

The polymer solution enters compartment 16A at a temperature of about 52° C. and has a polymer concentration such that the solution has an osmotic pressure substantially higher than that of the sea water stream passing through compartment 16 of cell 13. As a result, the differential in osmotic pressures provides a driving force which effectively passes saline free water from the sea water stream in compartment 16 through the water permeable membrane 15 into compartment 16A to increase the water content of the polymer solution leaving compartment 16A at outlet 23; the sea water leaving at outlet 19 of compartment 16 having an increased saline content which may be of the order of about 6–7%.

The water enriched polymer solution leaves compartment 16A, at outlet 23 at a temperature of about 50° C. and goes through a heat exchanger 24 which reduces the temperature of said solution to about 35° C. The water enriched polymer solution is further cooled to about 25° C. in a heat exchanger 25 by means of a branch line 26 carrying a portion of the salt water feed at 20°

C. through said heat exchanger 25 and thence to rejoin line 17, at the raised temperature of about 45° C.

The water enriched polymer solution from heat exchanger 25, at its reduced temperature undergoes phase separation and passes by way of line 27 to a settling tank 28 where the saline free layer 29 forms an upper stratum substantially free of polymer, and may be drawn off by product line 30 as substantially pure water available for drinking or agricultural usage. Also, in tank 28 there is formed a lower stratum 31 of polymer solution of decreased water content to provide the water extractive agent passing by line 32 and through pump 21 through heat exchanger 24 to have its temperature raised to about 45° C. and thence by line 20 to inlet 22 of compartment 16A of cell 13. A low pressure steam line at 33 connected to line 20 serves to raise the temperature of the polymer solution to 52° C. for entry into cell 13.

The membrane 15 is formed of a hydrophilic monomer such as vinyl pyrrolidone which may be copolymerized with a strength imparting, hydrophobic monomer such as vinyl acetate, methyl methacrylate, butadiene, styrene, chloroprene, acrylonitrile and mixtures thereof, together with a cross linking agent such as triallyl cyanurate, diallyl maleate, diallyl sebacate, divinyl benzene and the like.

By way of example, membrane 15 may be formed by copolymerizing 60% vinyl pyrrolidone, 20% styrene, 19.5% butadiene and 0.5% triallyl cyanurate, all by weight, in Teflon coated, spaced glass plate molds, to form the membrane of a thickness of the order of about $\frac{1}{32}''$ and which will swell in water to a thickness of about $\frac{1}{20}$ to $\frac{1}{16}''$. Also, membrane 15 may be formed by copolymerizing 75% vinyl alcohol, 24.5% butadiene and 0.5% diallyl maleate, all by weight, to form a thin water swellable sheet which is effective to pass water while being impermeable to salt, and which will have reasonable strength and resistance to normal pressure conditions in cell 13.

It is understood that with the osmotic pressure of the salt water in compartment 16 varying between 20 and 45 atmospheres, corresponding the the saline concentration of the salt water in said compartment which varies from 3% at the inlet thereof to about 6-7% at the outlet thereof; the concentration of the countercurrent polymer solution in compartment 16A must be sufficiently great as to give an osmotic pressure greater than that of the sea water.

Thus, the osmotic pressure at inlet 22 may be of the order of about 200 atmospheres and at outlet 23 of the order of about 100 atmospheres, with a mean difference of about 140 atmospheres corresponding to a hydrostatic pressure difference of 2100 p.s.i., which is the mean driving force for transporting saline free water through membrane 15. It is noted that the actual difference in hydrostatic pressure is essentially zero, thereby minimizing the pressure resistant characteristics of membrane 15.

Alternatively, the separatory membrane as shown at 15A, in FIG. 2, may comprise a layer 35 of polyvinyl pyrrolidone with a facing 36 on one surface thereof of an polyelectrolyte material such as an ion exchange resin of either the anion or cation type. Typically such ion exchange resin may be sulfonated polystyrene. However, to insure water permeability through the composite membrane, facing 36 should have a thickness of about 1 micron. Alternatively, the layer of polyvinyl pyrrolidone may be hydrolyzed on one surface thereof to convert the pyrrolidone groups to carboxylate groups, or may be reduced to form amine groups followed by chloromethylation to produce quaternary amine chloride groups, which have polyelectrolyte properties. It is understood that such chemical surface treatments of the polyvinyl pyrrolidone layer is confined to a very thin surface stratum. The membrane 15A is located in cell 13 with its facing 36 disposed for contact with the stream of sea water in compartment 16.

As an alternative to polyvinyl pyrrolidone, membrane 15 or 15A may include as a hydrophilic polymer, vinyl ether; N - N dimethyl acrylamide; N - N dimethyl methacrylamide; N - N dibutyl acrylamide; N - N dibutyl methacrylamide; N - N diethyl acrylamide; N - N diethyl methacrylamide; N - naphthyl acrylamide; N-naphthyl methacrylamide; and N-phenyl-methyl acrylamide.

The partially water soluble polymer in aqueous solution passing countercurrent to the sea water, compartment 16A of cell 13, is carefully selected so as to have a critical phase temperature in respect to water. Typically, such water solvent may be a copolymer of vinyl pyrrolidone and vinyl acetate in the proportion of 60/40 by weight.

Thus, whereas a solution of polyvinyl pyrrolidone in water has no critical temperature since aqueous solutions thereof of any concentration may be cooled to any temperature above 0° C. without phase separation; if vinyl pyrrolidone is copolymerized with vinyl acetate in the above noted proportions of 60/40 by weight, an aqueous solution thereof has a critical phase temperature with respect to water of about 50-60° C., see FIG. 3. By increasing the proportion of vinyl acetate in the copolymer, the critical temperature is correspondingly raised.

With the copolymer solution of 60/40 vinyl pyrrolidone-vinyl acetate and a concentration of 40% copolymer, entering compartment 16A at a temperature of about 52° C.; the copolymer solution can take up additional water passing through membrane 15 to reduce the concentration of the copolymer to about 28.3% at outlet 23 of compartment 16A.

Further, upon reducing the temperature of the water enriched copolymer solution, to about 25° C., phase separation takes place as indicated in the diagram of FIG. 3, and the resultant copolymer phase is substantially restored to its 40% concentration. The molecular weight of such 60/40 copolymer of vinyl pyrrolidone-vinyl acetate is about 8,000.

It will be apparent that the foregoing phenomena demonstrates the "poorness" of the water solvent at a given reduced temperature and the degree of control of such property may be attained by balancing the proportions of the hydrophilic and hydrophobic monomers forming the selected copolymer. Thus, various hydrophilic monomers other then vinyl pyrrolidone, such as vinyl alcohol, vinyl ether and the alkyl, aryl and aryl-alkyl acrylamides and methacrylamides, set forth above, may be copolymerized with hydrophobic monomers including methyl methacrylate, styrene and homologues thereof. Obviously, each combination of hydrophilic and hydrophobic monomers copolymerized to provide the solvent extracting medium, will have its own critical phase separation temperature and phase separation curve.

It has been found that the asymmetry of the coexistent phases of the copolymer solutions and water gives rise to separations wherein the aqueous phase has a very low copolymer content, which may amount to a few parts of copolymer to a million parts of water, thereby assuring an excellent extracted water product, free of contamination.

To insure optimum operation of the process, it has been found that the copolymers for the solvent solutions, should be as low as possible, insofar as molecular weight and viscosity is concerned. Thus, the molecular weight of such copolymers should be of the order of from about 5,000 to 20,000 and preferably from 7,000 to 12,000.

The rate of flow of sea water and copolymer solutions in cell 13 may be regulated in accordance with the capacity of the cell, selected copolymer solution and membrane, and the like. Thus, typically, the system may process sea water at the rate of 2000 gallons/hr. together with 2500 gallons/hr. of copolymer solution from tank 28, to provide 1000 gallons/hr. of saline free water in product line 30, leaving about 1000 gallons/hr. of sea water having a raised saline content of about 6–7% going to waste from heat exchanger 12 wherein the heat of said waste sea water is given up to the sea water feed in line 10.

It is understood that cell 13 may be made in sizes correlated to a desired capacity per unit and provided in systems of multiple units to produce a desired overall daily output of potable water. Thus, for the system described herein, the total effective surface of the membrane 15 may be of the order of about 1000 sq. ft. to handle the rates of flow indicated above.

As various changes might be made in the embodiment of the invention herein disclosed without departing from the spirit thereof, it is understood that all matter herein shown or described, shall be deemed illustrative and not by way of limitation except as set forth in the appended claims.

What is claimed is:

1. The method of desalinating sea water comprising passing a stream of sea water and a stream of an aqueous solution of partially water soluble copolymer of hydrophilic and hydrophobic monomers in counter current relation to each other with a water permeable, electrolyte impermeable membrane between and having its opposite surfaces in contact with the respective streams, said copolymer solution having a concentration to provide an osmotic pressure substantially greater than that of the sea water whereby saline free water is extracted from said stream of sea water and driven through said membrane into said copolymer solution to increase the water content thereof, said copolymer solution having a critical phase separation temperature, reducing the temperature of the water enriched copolymer solution to a temperature below said critical phase separation temperature to effect a separation thereof into a phase of saline free water substantially free of copolymer and a phase constituted of said first mentioned copolymer solution, and drawing off said phase of saline free water.

2. The method as in claim 1 wherein said membrane is a copolymerizate of hydrophilic and strength imparting hydrophobic monomers.

3. The method as in claim 2 wherein said hydrophilic monomer is vinyl pyrrolidone and said hydrophobic monomer is selected from the group consisting of vinyl acetate, methyl methacrylate, styrene, butadiene, chloroprene, and acrylonitrile.

4. The method as in claim 2 wherein said copolymerizate is formed of monomeric vinyl pyrrolidone, styrene, butadiene and a cross linking agent.

5. The method of claim 1 wherein said membrane is formed of a layer of polyvinylpyrrolidone and a facing of polyelectrolyte on one surface of said layer, said facing having a thickness of about 1 micron.

6. The method as in claim 5 wherein said polyelectrolyte comprises an ion exchange resin.

7. The method as in claim 1 wherein said partially water soluble copolymer is formed from a monomer selected from the group consisting of vinyl pyrrolidone, vinyl alcohol, and vinyl ether and copolymerized with a monomer selected from the group consisting of vinyl acetate, methyl methacrylate, and styrene, said copolymer having a molecular weight of from about 5,000 to about 20,000.

8. The method as in claim 7 wherein said partially water soluble copolymer is formed from vinyl pyrrolidone and vinyl acetate, said copolymer having a molecular weight of from about 7,000 to about 12,000.

9. The method as in claim 1 wherein said streams of sea water and copolymer solution are at a temperature below said critical phase separation temperature and the reduced temperature of said water enriched copolymer solution is below the temperature of said streams of sea water and copolymer solution.

10. The method of desalinating sea water comprising passing a stream of seawater at a given temperature in contact with one surface of a membrane highly permeable to water and highly impermeable to electrolytes, passing a stream of an aqueous solution of partially water soluble copolymer of hydrophilic and hydrophobic monomers having a critical phase separation temperature with respect to water which is higher than said given temperature, substantially at said given temperature in contact with the other surface of said membrane and in counter current relation to said stream of sea water whereby saline free water derived from said stream of sea water is driven through said membrane into said stream of copolymer solution to increase the water content thereof, removing the water enriched copolymer solution and reducing the temperature thereof to a point below said given temperature at which said water enriched copolymer solution separates into a saline free water phase substantially free of copolymer and a phase of aqueous solution of partially water soluble copolymer of reduced water content, and drawing off said saline free water phase.

11. The method as in claim 10 wherein said membrane is formed of a hydrophilic monomer and a membrane strengthening hydrophobic monomer copolymerized together with a cross linking agent.

12. The method as in claim 10 wherein said membrane is formed of a layer of polyvinylpyrrolidone with a thin facing of ion exchange resin on one surface thereof.

References Cited

UNITED STATES PATENTS

| | | | |
|---|---|---|---|
| 3,062,737 | 11/1962 | Azorlosa | 210—22 |
| 3,142,638 | 7/1964 | Blaisdell et al. | 210—53 |
| 3,216,930 | 11/1965 | Blew | 210—22 |

SAMIH N. ZAHARNA, *Primary Examiner.*

MORRIS O. WOLK, E. G. WHITBY, *Examiners.*